(12) United States Patent
Peary

(10) Patent No.: US 6,497,315 B2
(45) Date of Patent: Dec. 24, 2002

(54) BRAKE/CLUTCH MODULE WITH SIMPLIFIED FRICTION PAD SUBSTITUTION

(75) Inventor: Ryan T. Peary, Gray, ME (US)

(73) Assignee: The Montalvo Corporation, Gorham, ME (US)

( * ) Notice: Subject to any disclaimer, the term of this patent is extended or adjusted under 35 U.S.C. 154(b) by 3 days.

(21) Appl. No.: 09/771,788

(22) Filed: Jan. 29, 2001

(65) Prior Publication Data

US 2002/0100656 A1 Aug. 1, 2002

(51) Int. Cl.$^7$ .............................................. F16D 13/68
(52) U.S. Cl. .................. 192/107 R; 192/66.1; 192/30 W; 192/115; 188/1.11 W; 188/370
(58) Field of Search .................... 192/107 R, 30 W, 192/66.1, 115; 188/218 XL, 73.32, 1.11 W, 370

(56) References Cited

U.S. PATENT DOCUMENTS

| 3,388,775 A | 6/1968 | Baynes et al. |
| 3,885,650 A | 5/1975 | Klaue |
| 3,964,583 A | 6/1976 | Montalvo, Jr. |
| 5,178,235 A | 1/1993 | Montalvo et al. |
| 5,617,935 A | 4/1997 | Chuang et al. |
| 5,662,191 A | 9/1997 | Le Deit et al. |
| 5,671,827 A | 9/1997 | Demetriou et al. |
| 5,868,233 A | 2/1999 | Montalvo et al. |
| 5,890,566 A | 4/1999 | Yoshida et al. |

*Primary Examiner*—Saul Rodriguez
(74) *Attorney, Agent, or Firm*—Patricia M. Mathers; Thomas L. Bohan

(57) ABSTRACT

Modified friction pad and friction-pad receptale assembly for a brake/clutch module permitting greater ease inserting pad into and withdrawing it from the brake/clutch module. The pad is held into the receptacle by clips at the distal end of the receptacle rather than the proximal end. That configuration, in conjunction with finger-grip depressions near the proximal end of the pad, allow the pad to be removed with one hand. Additionally, the friction pad assembly protects the torque-resistor pad guides from wear by interposing the spring steel of the retaining clips between the pad assembly and these guides.

13 Claims, 3 Drawing Sheets

BRAKE/CLUTCH MODULE WITH SIMPLIFIED FRICTION PAD SUBSTITUTION

BACKGROUND OF THE INVENTION

1. Field of the Invention

The present invention relates to a module adaptable to performing either a brake or clutch function. More particularly the present invention relates to the friction pad assembly of such a module and to the receptacle for holding this pad assembly wherein the receptacle and pad assembly are configured so as to permit the latter to be easily inserted into and removed from the latter. Yet more particularly, the present invention relates to such a pad assembly and receptacle mutually configured so that the pad assembly can be removed/replaced from the receptacle by hand during short down-time periods, without the need to remove any other module components. The present invention relates further to such pad assembly and receptacle wherein the latter is protected against abrasion by the former.

2. Discussion of the Prior Art

The invention described and claimed below provides a continuing improvement in the ease with which the friction pads of various brake and clutch systems can be replaced. It relates to pad-containing modules of a type that can be used, depending on the configuration of the surrounding machinery, to perform either as a brake or as a clutch. These modules are described in a number of earlier patents, including several that are assigned to the assignee of the present invention. For economy of space and time, the pad of the present invention will be described entirely in terms of its being used in a braking module, though it is to be understood that everything that is said about the present invention applies to its use in a clutch module as well. Within the field of braking, the present discussion will for convenience be even more specific, again with no intention of narrowing the understood application of the present invention.

In particular, the pad and pad receptacle of the present invention will be described in the context of their use in web-tension maintenance in those manufacturing procedures in which a series of product modifications is carried out on a continuous webbing of flexible material ("web") as the web is conveyed along a production line. One example is the production of newsprint. Another is the imprinting of certain types of cloth. In all such operations, it is essential that the tension in the web be maintained above a certain threshold but not so high that it ruptures or otherwise damages the material making up the web. In one configuration, this tension is maintained by placing an adjustable drag on a shaft about which the flexible product is rolled and from which it feeds into the web. This drag can be imposed in a number of ways, but most commonly it involves pressing a brake pad (alternately referred to as a "brake shoe") against a rotor coupled to the shaft; the rotor takes the form of a planar friction plate. By varying the force with which the pad is pressed against the friction plate it is possible to vary the drag and hence to vary (or maintain constant) the tension in the web coming off the shaft. In practice, there will be a number of such pads and the pad pressure on the rotor is effected through the use of an array of pneumatic- or hydraulic-activated brake modules mounted in a fixed disk—a stator—commonly referred to as a "spider." It can be seen also that a clutch can be installed that works in a similar—though, in a sense, opposite,—fashion. That is, the pads will press against the rotor to prevent it from rotating until the web tension rises to a level exceeding the static friction force between the pads and the friction plate, at which point the friction plate will slip and the shaft will continue to rotate until the web tension once falls below sliding-friction force exerted on the friction disk by the pads.

It is advantageous to be able to change the above-described friction pads quickly and easily where they are used in production lines, where time is usually of the essence. For example, it is usually desirable to minimize the production-line down-time associated with removing and/or replacing the pads. A number of patents address the problem of quick pad replacement in brake/clutch modules. Such patents include Baynes et al. ("Disc Brake with Pocketed Quick Change Shoe Assembly," U.S. Pat. No. 3,388,775; 1968), Klaue ("Spreading Disc Brake with Removable Shoes," U.S. Pat. No. 3,885,650; 1975), Montalvo ("Mounting of Cylinders in Friction Brakes and Clutches," U.S. Pat. No. 3,964,583; 1976), Yoshida et al. ("Friction Pad for Disc Brake," U.S. Pat. No. 5,890,566; 1999), Demetriou et al. ("Air Disc Brake," U.S. Pat. No. 5,671,827; 1997), Le Deit et al. ("Assembly Comprising a Friction Pad . . . ," U.S. Pat. No. 5,662,191; 1997), Chuang et al. ("Friction Pad For A Disk Brake," U.S. Pat. No. 5,617,935).

Most closely related to the specific nature of the present invention are Montalvo et al. (U.S. Pat. No. 5,178,235; 1993) [hereinafter Montalvo I] and Montalvo et al. (U.S. Pat. No. 5,868,233; 1999) [hereinafter Montalvo II, which is further referenced in application Ser. No. 09/542,639 seeking reissue of Montalvo II]. Both of the last-named patents are assigned to the assignee of the present invention; they describe the particular nature of the modules to which the present invention is directed. They are to be understood to be incorporated into the present discussion.

The spider in which the brake modules are to be mounted is in general a metallic disc thick enough to give it rigidity against the torsional forces exerted on it during the braking process. Distributed around the circumference of the spider, generally equally spaced, are holes, each adapted to receive one of the brake modules. The spider is affixed to a base that is itself floor-mounted. The friction disc (the rotor) is affixed to the roll. Typically, the spider is interposed between the roll and the friction disc. In such a configuration, a shaft coupled to the roll rests on a bushing in the center of the spider, with a portion of the shaft extending to the outboard side of the spider. It is to the outboard end of the shaft that the friction disc is rigidly affixed. The friction disc plane is parallel to that of the spider and both are substantially vertical. Because the brake modules are around the full 360 degrees of the spider, some means must be used to prevent the pad assemblies from falling out of the modules due to gravitational forces.

In addition to gravitational forces, the pad assemblies are exposed to the much greater force resulting from the braking action itself. When the pads are pressed against the rotating friction disc the resulting frictional force tends to carry the pad around with the friction disc. To resist this torsional force "torque resistors" are placed adjacent to the pad assemblies. In the earlier designs described in the prior art such as Montalvo I, these torque resistors were referred to as "torque posts," since they were circular in cross-section; the pad assembly had semi-circular openings on its perimeter, one on the distal extremity and a matching one on the proximal extremity, through which torque posts passed when the pad assembly was installed in the module. (As used throughout this discussion, "distal" refers to the direction toward the center of the spider and "proximal" refers to the direction away from the center, that is toward the perimeter of the spider. Similarly, with respect to a component, the end of the component intended to be closer to the spider center is the distal end of that component and conversely with respect to its proximal end.) These torque posts prevented the pads from rotating under the torque transmitted to them from the friction plane. They also prevented the pads from moving out radially from the axis of the spider. However, this arrangement required a removal of the proximal post before one could withdraw a pad assembly. Once that post was removed, the pad assembly could be slid along the line between the erstwhile positions of the two torque posts—a line substantially parallel to one of the radii of the spider—and hence removed from the module. Similarly, the new pad assembly would be slid in along that same line until it fit snugly against the distal torque post, at which point the outer torque post (the proximal post) would be re-installed so as to bind the pad assembly in place. Although simpler than yet earlier designs, this design required considerable time and in general the use of tools to change pads.

As can be seen, the torque posts of Montalvo I also prevented the pad assemblies from falling out under gravity. An additional important role for the torque posts is to guide the installed pad assembly as the pad is pushed forward so as to come into contact with the friction disc.

Subsequent developments, in particular Montalvo II, replaced the posts at the two ends of the pad assembly with torque resistors positioned alongside of the installed pad assembly, where they could continue to hold the assemblies against the forces applied by the friction disc and also to serve as guides at the pad was urged forward toward the friction disc. These new torque resisters were sometimes characterized as "torque legs" rather than posts. They were not circular, but rather elongated in the distal-proximal direction of the brake module, in such a way as to form, in connection with the base from which they protruded, a receptacle into which the pad assembly could be inserted. Although these torque legs resisted torsional forces, they could not prevent the pad assemblies from falling out under gravity. To address that need, Montalvo II taught retainer clips affixed to the outside of the torque legs and extending proximally from those torque legs in such a way that they closed over the proximal ends of a pad assembly once the assembly was in place. These clips were of such a nature that once they had snapped in place, it was necessary to spread them apart in order to extract the pad assembly, and to hold them apart while a new pad assembly was being installed. This at the least required two hands, or some kind of tool arrangement, to change pads.

Another potential problem with the torque resistors of the prior art, whether torque legs or posts, is that they can be eroded by the recurrent forces exerted against them when the pad for which they serve as retainers and guides is pressing against the rotating friction disk. This effect is exacerbated since the object in contact with the torque resistors—the pad assembly—includes a hard backing plate to which the pad is affixed. Because of the role it plays, that backing plate is typically made of hard steel. On the other hand, in terms of ease of manufacture and weight considerations, the torque resistors are preferably of a light-weight, easily machined metal such as aluminum. The steel backing plate brought into contact with the torque resistor tends to wear the latter away, requiring a re-furbishing of the brake module during which the torque resistors are replaced. Further, this occurs long before other parts of the modules have to be refurbished.

A final problem with some of the prior art brake modules is the possibility of inserting the friction pad assembly upside down. This can have serious consequences, since this inadvertent inversion results in the hard backing plate rather the friction pad itself being pressed against the rotor during braking. The deleterious consequences range from damaging the surface of the friction disc to the generation of flying fragments, that is, shrapnel.

What is needed therefore is a brake/clutch module that allows for easy one-handed withdrawal and insertion of the associated friction pad assembly. What is further needed is such a module and associated friction pad assembly that do not lead to a reduction in the mean time between repairs below what it is for present brake/clutch modules. What is yet further needed is such a module and associated friction pad assembly so configured that it is not possible to insert the pad assembly upside down. What is desirable is that such a friction pad assembly can be used with much of the installed base of present brake/clutch modules.

SUMMARY OF THE INVENTION

An object of the present invention is to provide a brake/clutch module that allows for easier withdrawal and insertion of the associated friction pad assembly than has hitherto been possible. More particularly it is an object of the present invention is to allow for such withdrawal and insertion that can be accomplished by one hand without the need of any tools or removal of parts from the module other than the pad assembly itself. A further object of the present invention is that the modifications it introduces will not adversely affect the mean time between repairs compared with that associated with the modules the invention seeks to replace. A yet further object of the present invention is that it renders impossible the error of inserting the friction pad assembly upside down in the module. It is also an object of the present invention that the new friction pad assembly can be used with some of the already-installed base of modules.

The objects set out above are achieved by a small change in shape of the friction pad assembly and an inversion of the retainer clips from that of Montalvo II. In particular, the retainer clips are deployed so that they grip the pad assembly not at the proximal end but rather at the distal end. Furthermore, the gripping takes place in the device of the present invention in such a way that it is easily overcome by the operator pulling proximally on the pad assembly. In some embodiments of the present invention, the pad is equipped with finger indentations on the sides of the pad near the proximal end, so as to further assist the operator in pulling out the pad assembly. By these changes, it becomes possible for operator to pull the pad assembly out from its receptacle so quickly that there is minimal exposure to high temperatures and hence the procedure can be done (and the pad replaced in the module) in the midst of operation, without waiting for the pad to cool down.

In order to protect the torque legs, which resist the torque imposed by the friction disc and also serve to guide the pad as it is advanced toward the friction disc, the retainer clips of the present invention are further re-configured from the cited earlier design. In the module of the present invention, the retainer clips are caused to run along that side of the torque leg that would otherwise be immediately adjacent to the pad assembly. In other words, they run along the inside of the legs rather than along the outside as was the case with Montalvo II. The spring steel needed to give the retainer clips the strength and resiliency demanded for their releaseably gripping of the pad assembly is much stronger and wear-resistant than the light-weight material (generally aluminum) used for the torque legs and much of the rest of the receptacle. Thus, the clips serve a second purpose, protecting the torque legs against the wear they would otherwise receive from the pad assembly being forced against them by the torsional forces exerted by the friction disc.

The object of making it impossible to insert the pad assembly upside down is achieved in the present invention by a keying addition governing the joinder of the pad assembly and its receptacle. In one embodiment, this involves the addition (a) of a post in the module in a location asymmetric to the module's center line and (b) a matching concavity in the pad assembly.

As stated previously, for definitiveness, the present invention will discussed in terms of its use with brake modules employed in regulating web tension. However, it can be seen that the present invention has an application wherever a brake or clutch module is used in a context where it is beneficial to be able to quickly and easily change the friction pad. (It is noted, for example, that some of the prior art cited relates to brake assemblies used with automobile and truck brakes.)

The apparatus of the present invention shares with some of the prior art the use of a torque collar which forms the base for torque legs and together with those torque legs forms the receptacle for the friction pad assembly of the present invention. The torque collar, being open in the center, allows a piston to pass through it and against the backing plate of the pad assembly—the outer reaches of which are resting on the torque collar,—so as to urge the pad assembly forward, bringing the friction pad against the friction disc. There are a variety of mechanical displacement means by which the piston is moved forward so as to force the pad(s) against the disc to be braked. Typically this is done by inflating air bladders behind the pistons. Other devices, including but not limited to hydraulic cylinders and linear motors, may in the alternative be. used to perform this function.

Just as with Montalvo II, retainer clips are used in the device of the present invention to secure the friction pad assembly within the module. In contrast with the prior art, however, these clips are inverted in the sense that the pad-gripping portions of the clips are located at the distal rather than the proximal end of the apparatus. Furthermore, the manner in which the retainer clips of the present invention grips the pad assembly permits smooth withdrawal of the pad assembly with a relatively small force being required to overcome the retainer grip. This contrasts with the cited prior art wherein the retainer clips wrapped around the proximal end of the pad assembly when the latter was in place and had to be separately dealt with (spread apart) as part of the withdrawal and insertion processes. Each retainer clip of the present invention then can be pictured as divided into a portion that is affixed to one of the torque legs (the fixed portion) and a portion that extends distally from the torque leg releaseably snaps onto one side of the pad assembly (the gripping portion). The latter portion of the retainer clip has a shape conforming to an indentation in the side surface of the pad assembly near its proximal end. The rest of each retainer clip is deployed so as to be between a torque leg and the pad assembly when the latter is in place. In some embodiments of the present invention, that portion of the retainer clip wraps completely around the torque leg.

There further developments and refinements to the present invention that will occur to those skilled in the art. These include, but are not limited to, shaping the pad assembly so that it has "shoulders" that halt the proximal advance of the assembly once the retainer clips have snapped into place. When there is an indexing post near the proximal end of the pad assembly, as is the case in the Preferred Embodiment, the assembly-halting function of these shoulders is redundant to that of the indexing post. Other features that may be incorporated into the pad assembly of the present invention include shaping the assembly in ways that, while they play no function in the present invention, allow the pad to be used in some of the brake modules of the prior art.

DETAILED DESCRIPTION OF THE PREFERRED EMBODIMENT

The following description of the Preferred Embodiment is not intended to reduce in any way the scope of the present invention as set out in the Summary and the Claims but rather is meant to serve the usual function of describing in detail the mode of the present invention which is at the time of this writing considered to be the best mode.

Figure 1:
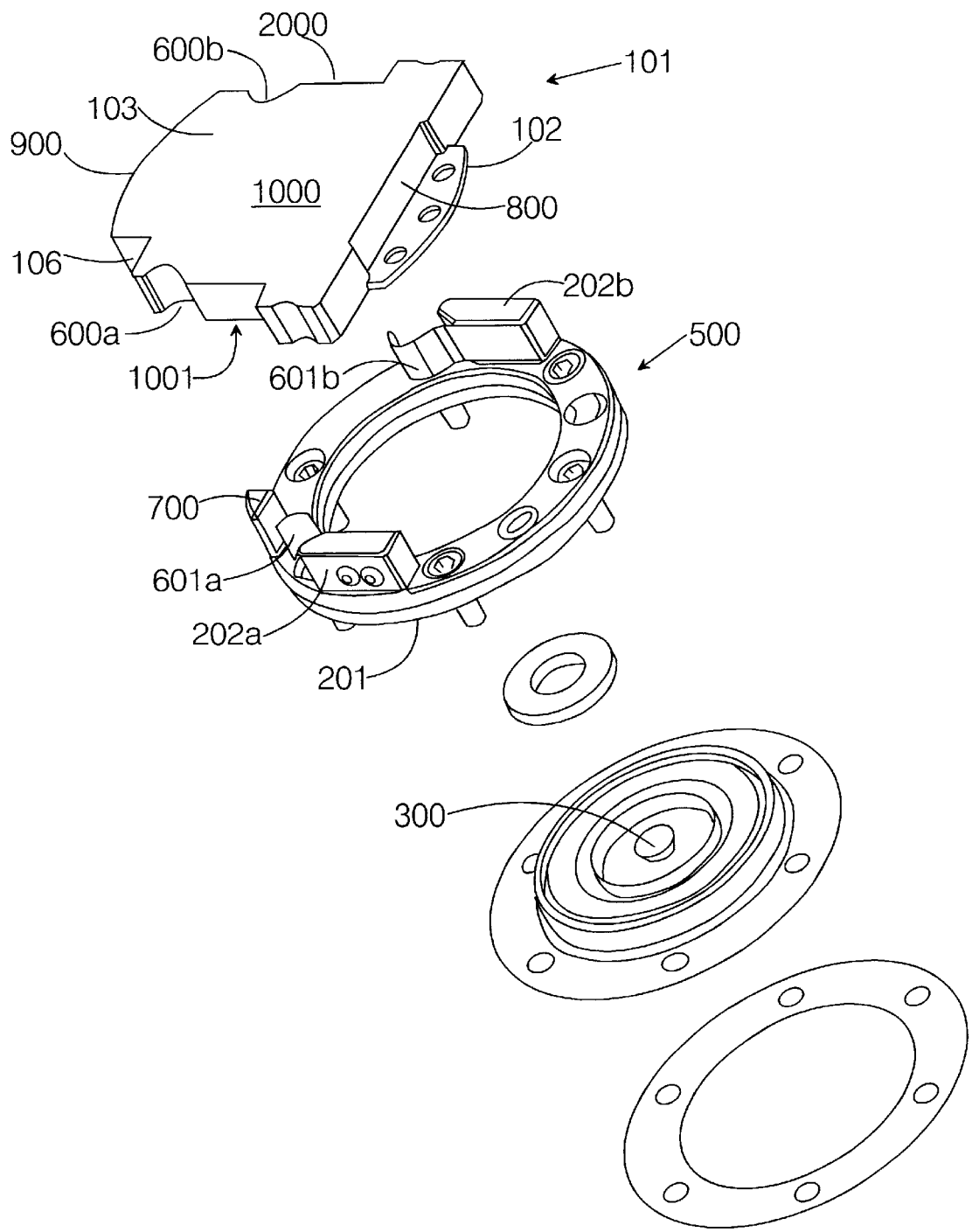
FIG. 1 shows an exploded view of the friction pad assembly and friction-pad-assembly receptacle corresponding to the Preferred Embodiment of the present invention, along with portions of the diaphragm piston that drives the friction pad forward against the friction disc.

FIG. 1 shows the friction pad assembly 101 according to the Preferred Embodiment of the present invention. The friction pad assembly 101 consists of a friction pad 103 and a backing plate 102, with the pad 103 being affixed by heat-resistant epoxy to the backing plate 102, the latter being only partially visible at the proximal end of the pad assembly 101 sticking out from under the pad 103. Indeed, the backing plate 102 is substantially coextensive with the underside of the friction pad 103. In the Preferred Embodiment of the present invention, the backing plate 102 is made of hard steel. Note further that the friction pad 103 can be described as having a planar top surface 1000 and a planar bottom surface 1001 with the backing plate 102, also planar, affixed to the planar bottom surface 1001. In addition, the pad assembly 101 has a back surface 800 at the proximal end of the pad assembly 101 and a front surface 900 at the distal end. The rest of that part of the pad 103 that extends between the top surface 1000 and the bottom surface 1001 will be referred to as the side surface 2000. (See FIG. 2.)

Figure 3:
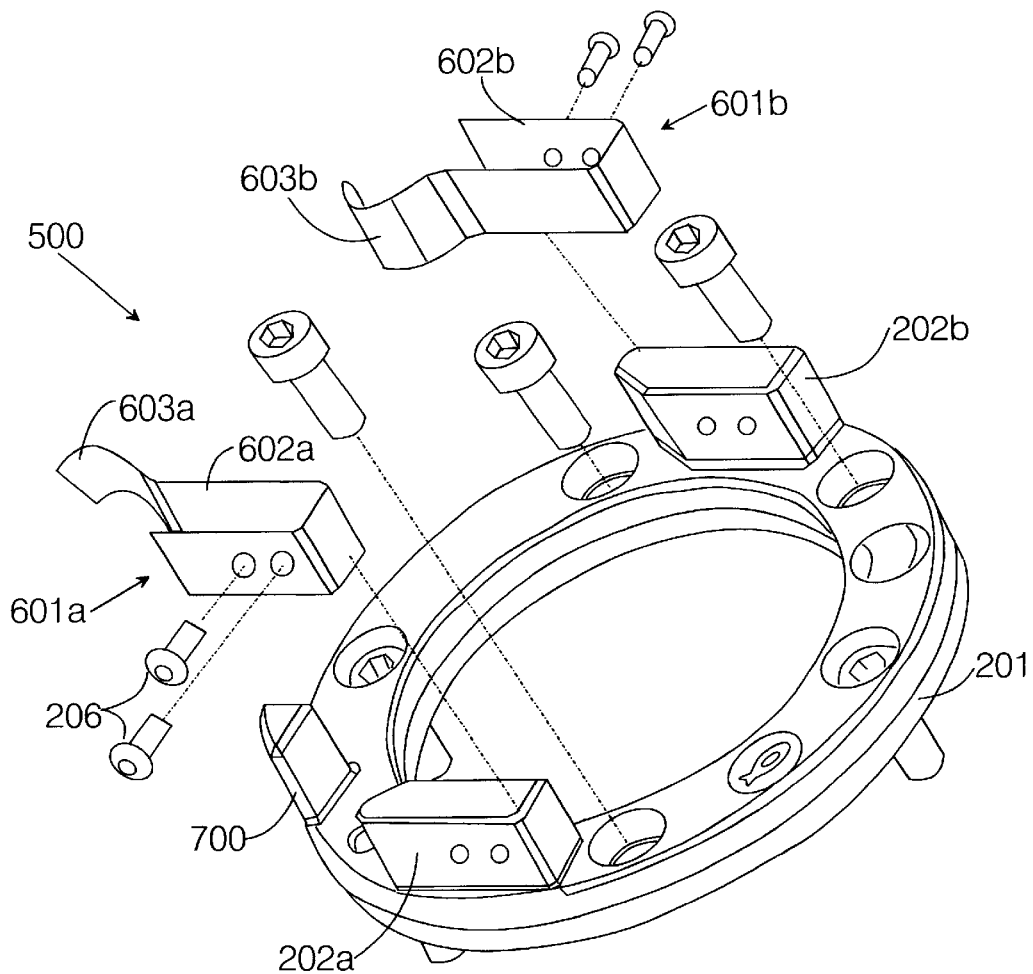
FIG. 3 shows an exploded view of the receptacle of the Preferred Embodiment of the present invention, including the torque collar, torque legs, and retainer clips.

A receptacle 500 for the pad assembly 101 is shown both in FIG. 1 and, in exploded form, in FIG. 3. This receptacle 500 includes in major part a torque collar 201, a left torque leg 202a, a right torque leg 202b, a left retainer clip 601a, a right retainer clip 601b, and an indexing post 700. It will be seen in FIG. 1 and in more detail in FIG. 3 that the retainer clips 601a, 601b are wrapped around the respective torque legs 202a, 202b. The portion of each of the clips 601a, 601b that is wrapped around a torque post is referred to as the fixed portion 602a, 602b of the clip. In addition, there is a portion of each of the retainer clips 601a, 601b that extends distally beyond the end of the associated torque leg. That portion of each of the retainer clips 601a, 601b is referred to as the gripping portion 603a, 603b. Together the gripping portion 603a of the left retainer clip 601a and the gripping portion 603a of the right retainer clip 601b releaseably grip the end of the pad assembly 101 once the latter has been put in place in the receptacle 500.

When the pad assembly 101 has been installed in the receptacle 500, and braking is not being applied, the backing plate 102 rests on the torque collar 201. In addition, the two torque legs 202a, 202b along with their respective associated retainer clips 601a, 601b are immediately adjacent to the side surface 2000 of the pad assembly 101. Finally, it will be seen that with the pad assembly 101 inserted in the receptacle 500 the indexing post 700 will fit snugly into an indexing indentation 106 of the pad assembly 101. In this manner, the pad assembly 101 is nestled within the receptacle 500.

FIG. 3 shows the receptacle 500 incorporating the torque collar 201, the two torque legs 202a and 202b, and the indexing post 700. As assembled, the torque legs 202a, 202b and the indexing post 700 are all rigidly affixed to and protrude from the top surface of the torque collar 201. Also shown in FIG. 3 are the retainer clips 601a, 601b lifted away from the torque legs 202a, 202b to which they are normally affixed. FIG. 1 shows the left retainer clip 601a and the right retainer clip 601b in their functional positions. They serve identical and symmetrical functions, which will therefore be discussed only in connection with the left retainer clip 601a. Left retainer clip 601a can be seen to form in part a three-sided sleeve that slips over and surrounds on three sides the left torque leg 202a, to which it is secured by clip-screws 206. In addition, the left retainer clip 601a includes a left snap-in portion 603a that extends toward the center of the torque collar 201 when the module is assembled. It is thus seen that the left retainer clip 601a is interposed between the left torque leg 202a and the pad assembly 101. In the Preferred Embodiment the left retainer clip 601a and the right retainer clip 601b are both made from stainless steel type 17-7 PH, condition C. When the module 100 is in its functional configuration, the two snap-in portions 603a, 603b, respectively, nest in two snap-in receiving hollows 600a and 600b of the pad assembly 101.

The indexing post 700 is positioned on the torque collar 201 off to one side of the mid-line between the left torque leg 202a and the right torque leg 202b. That is, the indexing post 700 is not located in a position symmetric to the positions of the left torque leg 202a and the left torque leg 202b, respectively. This is so that the indexing post 700 can serve to ensure that the pad assembly 101 is inserted in the correct orientation, the orientation that ensures that the pad 103 and not the backing plate 102 faces the disc to be braked and, similarly, that the backing plate 102 rather than the friction material 103 is adjacent to the torque collar 201.

Figure 4:
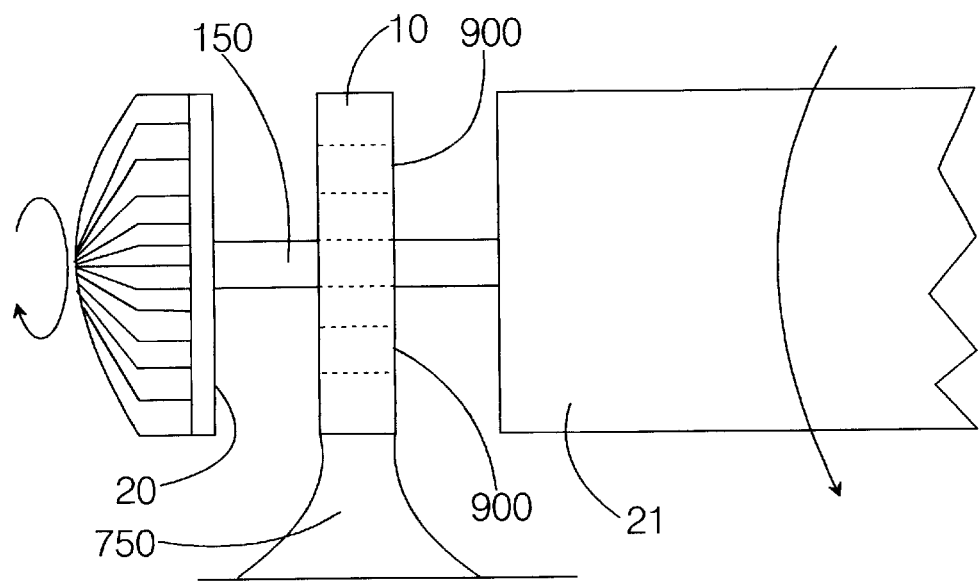
FIG. 4 is a schematic drawing of a typical mounting plate in which a plurality of the modules of the present invention can be mounted, along with a depiction of a rotating disc of the type that the device of the present invention will be used to brake.

In order to apply drag to the object being controlled, such as a rotating roll, the pad assembly, 101 is pushed forward— that is, upward with respect to the torque collar 201—by a piston 300, as shown in FIG. 1, so that the pad 103 is pressed against a friction disc 20 affixed to that object (see FIG. 4). The piston 300 is pushed pneumatically or hydraulically in the typical application. When the force driving the piston 300 is reduced or removed, the piston 300 returns toward its rest position, pulling the pad assembly 101 back with it, as the result of affirmative coupling between the piston 300 and the backing plate 102. In the Preferred Embodiment, this coupling is achieved magnetically, so that there is no fixed impediment to the withdrawal of the pad assembly 101 from the module 100 such as might be presented, for example, by a screw- or pin-based coupling.

The manner of juxtaposing the brake modules with the object on which drag is to be placed is shown in FIG. 4, which shows in schematic form a rotating roll 21, a spider 10, and the friction disc 20 rigidly coupled to a shaft 150 that in turn rotates with the roll 21. When the pad 103 is pressed against the rotating friction disc 20 so as to exert a torque on the friction disc 20, the friction disc 20 will exert a torque of equal magnitude on the pad 103. This "reaction" torque will tend to rotate and/or translate the pad assembly 101 with respect to the receptacle 500. The pad assembly 101 is held against such motion by the receptacle 500 and in particular by the two torque legs 202a, 202b and the indexing post 700 protruding from the torque collar 201.

Figure 2:
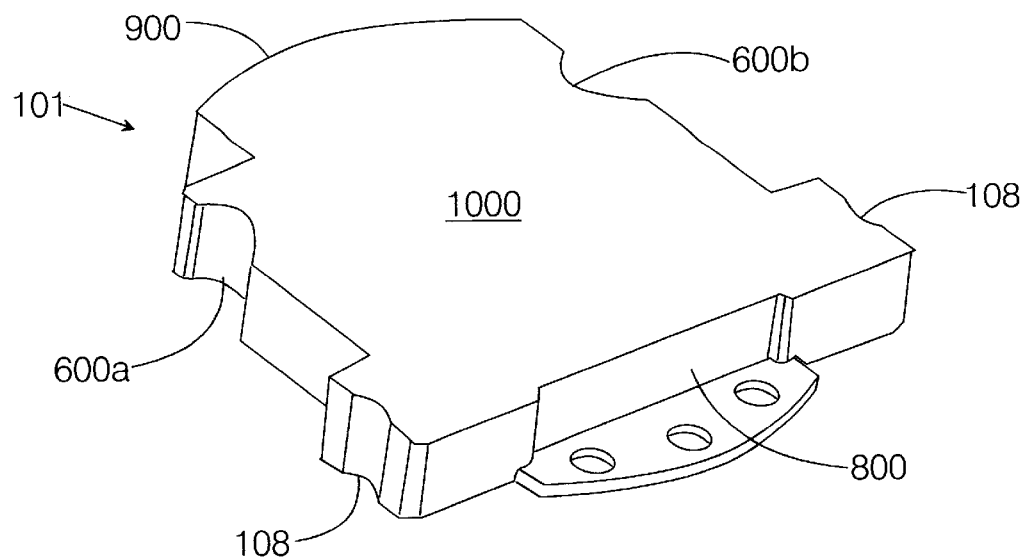
FIG. 2 shows an isolated view the pad assembly of the Preferred Embodiment of the present invention.

Note, however, that the pad assembly 101 is not held by the torque legs 202a, 202b from sliding in a direction parallel to the long axes of the torque legs 202a and 202b, that is in a proximal direction with respect to the receptacle 500. That function is served by the retainer clips 601a and 601b and in particular by the gripping portions 603a and 603a of those retainer clips by virtue of their snug fit within the two receiving hollows 600a and 600b formed in the pad 103 and backing plate 102. This fit is snug enough to hold the brake pad 101 in place against gravitational forces regardless of the orientation of the module 100 with respect to the vertical. At the same time the fit is not so snug that the pad assembly 101 cannot be pulled out by an operator using one hand and pulling proximally on the pad 103. To facilitate this pulling there are two arcuate recesses 108 in the side surfaces of the pad assembly 101, as shown in FIG. 2. The two arcuate recesses 108 are available for the operator to grip with the thumb and forefinger (or middle finger) of one hand while pulling out or inserting the pad assembly 101. In the Preferred Embodiment, the backing plate 102, though substantially coextensive with the pad 103 does not extend out to the periphery of the pad 103 at the region of the recesses 108. This helps limit the operator's fingers to contact with the pad 103, a relatively poor thermal conductor, and to prevent them from contacting the backing plate 102, made of metal and hence a good thermal conductor; thus, the operator is protected from the transfer of significant heat during the short time he/she is pulling out the pad assembly 101.

Note that in general a multiplicity of exemplars of the module and associated pad assembly 101 will be deployed. See for example FIG. 4, which shows a spider 10 configured with a number of openings 900 around its periphery for the installation of these exemplars. Each module 100 is mounted so that its proximal end is the most accessible and so that the line between its proximal end and its distal end is substantially lined up with a radius vector of the mounting plate, the spider 10. Then, one installs each associated pad assembly 101 by pushing the pad assembly 101 from the proximal end of the receptacle 500 toward the distal end of the receptacle 500, pushing the pad assembly 101 toward the axis (the center) of the spider 10. FIG. 4 also shows the spider 10 in conjunction with a friction disc 20, the friction disc 20 being rigidly coupled to a roll 21. The mount 750 for the spider 10, just suggested schematically, fixes the spider 10 solidly with respect to the room where the work is being carried out. A shaft 150 on which the friction disc 20 is mounted, passes through the spider 10 supported by a bushing, not shown. This friction disc 20 rotates with the roll 21, and drag placed on the friction disc 20 serves to place drag on the roll 21 and hence to place tension on a web feeding off of the roll 21.

Figure 5:
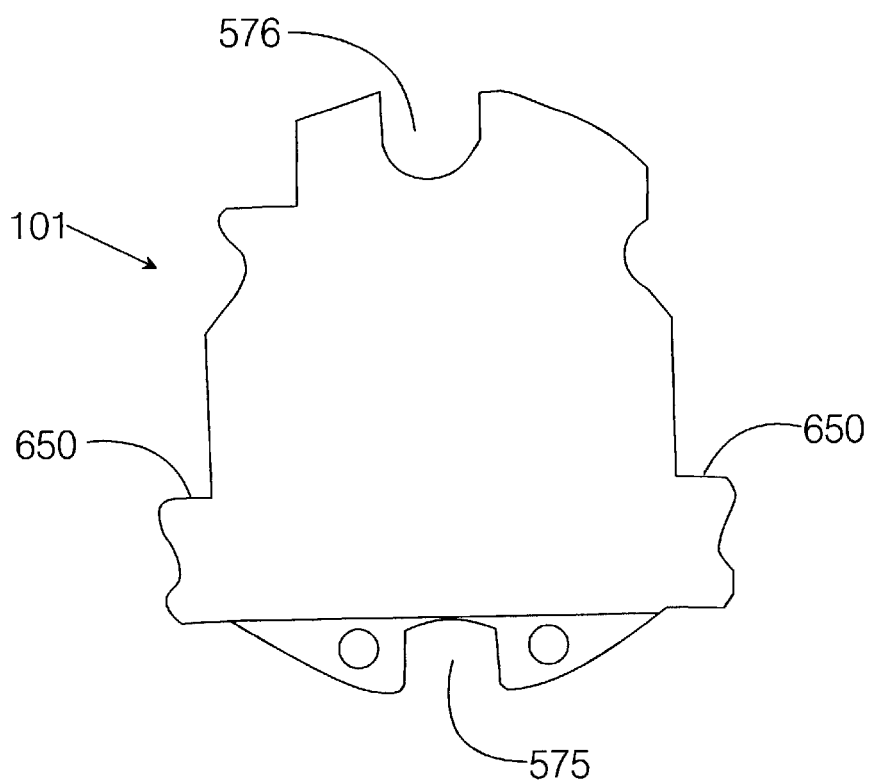
FIG. 5 shows a top view of an alternate friction pad assembly according to the present invention, with torque-post openings in addition to the rest of the configuration shaped to be received in the Preferred Embodiment receptacle of the present invention.

FIG. 5 shows the pad assembly 101 with shoulders 650 identified. These can provide additional stops of the assembly 101 as it is inserted into the receptacle 500, because they butt up against the proximal ends of the torque legs 201a, 201b when the assembly 101 is fully installed. Note a variant on the assembly 101 as shown in FIG. 5 and that is that roughly arcuate cut-outs 575, 576 occur at the proximal and distal ends, respectively of the assembly 101. These cut-outs 575, 576 enable the assembly 101 of the present invention to be used with much of the installed base of the prior art brake/clutch modules.

I claim:

1. Friction-coupling apparatus to be used with modules configurable to provide either a brake function or a clutch function, said apparatus comprising:

a friction-assembly receptacle having a torque collar with a substantially planar base surface, a pair of torque legs arising perpendicular to said torque collar, each torque leg having a distal end and a proximal end, said pair of torque legs defining an assembly insertion channel extending from said distal end to said proximal end of said torque legs, and a pair of retainer clips, and a friction assembly having a perimeter comprising a front surface, a back surface, and two side walls respectively extending therebetween, wherein a receiving hollow is disposed in each of said side walls;

wherein each one of said retainer clips has a gripper section and an affixed section, said affixed section attaching to a respective one of said torque legs and said gripper section extending beyond said distal end of said respective one of said torque legs and having a spring that is receivable in said receiving hollow, wherein said friction assembly is insertable into said channel by sliding said front surface of said friction assembly past said distal end of said torque legs, and wherein, having been so inserted, said gripper section releasably snaps into said receiving hollow in a corresponding side wall of said friction assembly.

2. The apparatus described in claim 1 wherein said retainer clips have a shape and strength that allows said friction assembly to be inserted into or withdrawn from said receptacle by one hand without need of tools.

3. The apparatus described in claim 1, wherein said friction assembly includes a friction pad and a backing plate, wherein said friction pad is affixed to said backing plate.

4. The apparatus described in claim 3, wherein said backing plate is made of a ferromagnetic material.

5. The apparatus described in claim 1, wherein said retainer clips are made of spring steel.

6. The apparatus described in claim 1, said torque collar further including an indexing post that protrudes perpendicularly from said base surface and is disposed on said base surface asymmetrically relative to said torque legs to ensure a proper orientation of said friction assembly in said friction-assembly receptacle, wherein said friction assembly has an indexing indentation, and wherein said indexing post mates with said indexing indentation whenever said friction assembly is fully inserted into said receptacle with said proper orientation.

7. The apparatus described in claim 3, wherein finger-grip indentations are located near a proximal end of said friction pad.

8. The apparatus described in claim 1, wherein said friction pad has a pair of shoulders, each one of said shoulders butting up against said proximal end of each one of said torque legs when and only when said friction assembly is fully inserted into said receptacle.

9. Apparatus as claimed in claim 1, wherein said affixed section of each of said retainer clips extends along one of said torque legs so as to be interposed between said one of said torque legs and said friction assembly when said friction assembly is inserted into said receptacle.

10. Apparatus as claimed in claim 1, wherein said retainer clips are made of a material that is more durable than that of said guide posts.

11. Apparatus as claimed in claim 6, wherein a torque-post-receiving concavity is disposed at said front surface and said back surface of said friction assembly.

12. Apparatus as claimed in claim 1, wherein said torque leg has an inner side wall that extends between said distal end and said proximal end and said affixed section of each of said retainer clips extends along said inner side wall so as to be interposed between said torque leg and said friction assembly when said friction assembly is inserted into said receptacle.

13. Apparatus as claimed in claim 12, wherein each said torque leg also has an outer side wall and a proximal end wall, said inner side wall and said outer side wall being substantially parallel to each other and said proximal end wall extending perpendicularly between said inner side wall and said outer side wall at said proximal end of said torque leg, wherein said affixed section of said retainer clip has a shape that fits snugly around said inner side wall, said outer side wall, and said proximal end wall, and wherein said gripping section extends from a portion of said affixed section that is disposed adjacent to said inner side wall.

* * * * *